(12) United States Patent
Barlow et al.

(10) Patent No.: US 7,106,848 B1
(45) Date of Patent: Sep. 12, 2006

(54) METHOD AND APPARATUS FOR IN-PROGRESS CALL FORWARDING

(75) Inventors: Jacqueline M Barlow, Bridgewater, NJ (US); David S Barlow, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 579 days.

(21) Appl. No.: 10/165,000

(22) Filed: Jun. 7, 2002

(51) Int. Cl.
*H04M 3/42* (2006.01)

(52) U.S. Cl. ............... 379/212.01; 379/211.01; 379/211.02; 379/215.01; 379/201.01; 379/201.12; 379/207.12; 379/219; 455/414.1; 455/417; 455/455

(58) Field of Classification Search .......... 379/212.01, 379/211.01, 211.02, 215.01, 201.01, 201.12, 379/207.12, 219; 455/414.1, 417, 455
See application file for complete search history.

(56) References Cited

U.S. PATENT DOCUMENTS

| | | | | |
|---|---|---|---|---|
| 5,249,221 | A * | 9/1993 | Ketring ............... | 379/214.01 |
| 5,390,233 | A * | 2/1995 | Jensen et al. .......... | 455/417 |
| 5,436,963 | A * | 7/1995 | Fitzpatrick et al. ..... | 379/218.01 |
| 5,583,925 | A * | 12/1996 | Bernstein ............ | 379/202.01 |
| 6,192,120 | B1 * | 2/2001 | Yamagishi et al. ..... | 379/215.01 |
| 6,705,916 | B1 * | 3/2004 | Roberts et al. ......... | 455/445 |
| 6,853,718 | B1 * | 2/2005 | Bedingfield et al. ... | 379/212.01 |
| 2002/0034290 | A1 * | 3/2002 | Pershan | |

OTHER PUBLICATIONS

Newton's Telecom DIctionary, 8th Edition, Nov. 1994, p. 565.*
Henon Method for in-progress telephone call transfer between a wireless telephone and a wired telephoenusing a short range communication control link Dec. 8, 1999.*

* cited by examiner

*Primary Examiner*—Quynh H. Nguyen
(74) *Attorney, Agent, or Firm*—Michael Haynes PLC; Michael N. Haynes; Dale R. Jensen

(57) ABSTRACT

The present invention is a method and system for transferring calls among communicating devices connected through a public network. The service is offered by a public network to permit a party in a ongoing conversation to transfer a call to another communicating device that may be more convenient to use, such as from a mobile telephone experiencing static to a land-based telephone, or from a home telephone to a mobile phone as a party leaves the home. In a method according to the invention, the network first establishes a connection between two communicating parties. The network then receives from one of the parties a request to transfer the call to another communications device. The network then transfers the call. The invention may be entirely network-based, in which case there may be a database of transferee devices stored on the network. Alternatively, the invention may be hybrid network-based and premises equipment-based, in which case the database of transferee devices may be stored in the premises equipment.

20 Claims, 5 Drawing Sheets

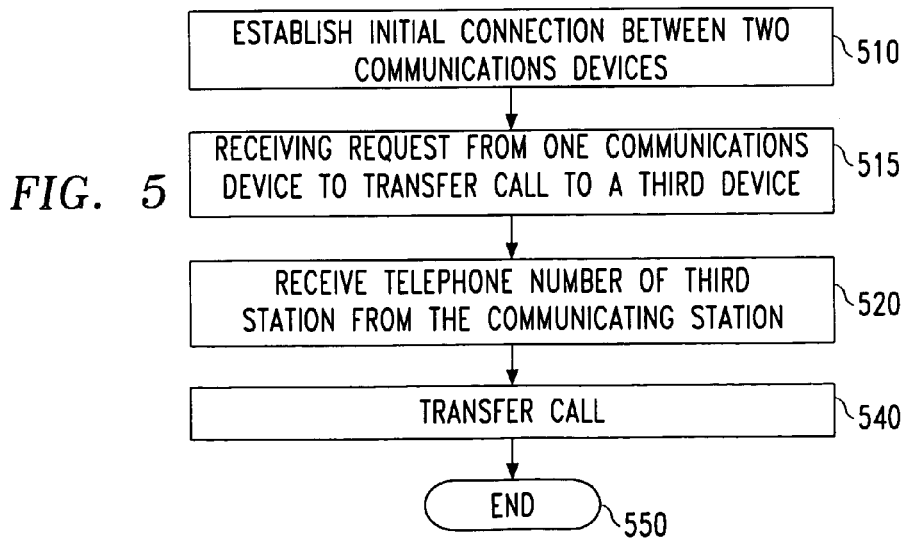

METHOD AND APPARATUS FOR IN-PROGRESS CALL FORWARDING

FIELD OF THE INVENTION

The present invention relates generally to services offered by public switched networks such as the Public Switched Telephone Network (PSTN), and, more particularly, to a method for conveniently transferring an ongoing communication from one communications device to another.

BACKGROUND OF THE INVENTION

The term "communications device" as used herein shall include wireless and land-line-based telephones as well as computers, wireless personal digital assistants (PDA's) and other devices used in connecting to communications networks. A party to a conversation over a communications network participates in that conversation using any one of a number of communications devices available today. For example, a party wishing to place a telephone call from the home frequently uses a land-line telephone, in order to control costs or to assure the audio quality of the conversation. A caller from a vehicle or from a location remote from the home frequently uses a wireless cellular telephone. While a caller initiating a call has a choice as to the type of communications device used, the situation of the caller often changes during the conversation and the caller may wish to continue the conversation on a different type of communications device. As to the called party, that party must pick up the call using the communications device on which it was received, and is given no choice.

The situation therefore frequently arises in which a participant in a communication wishes to continue that communication but prefers not to continue it using the communications device on which the communication is currently being conducted. For example, a party may have been waiting for an important call on a land-line phone and that call comes in just before the party must leave for a doctor's office. The party desires to continue the call on a wireless phone while in transit to the doctor's appointment. In another example, a party conducting a conversation on a cell phone arrives home, and wishes to continue the call from the land-line phone in the home. The party may wish to do so in order to switch to land-line rates, or because the party's cellular telephone battery may be low, or because the party may simply desire a better connection.

In a further example, a party is on a conference call and must leave her office and continue the call in her car. The party does not want to disrupt the other callers on the call by hanging up and redialing into the conference call from her cell phone. Alternatively, a party may be using instant messaging on a computer. The party may wish to continue the conversation but may be forced to discontinue using the computer, perhaps to allow other family members access.

In another example, a branch of a chain store receives a call inquiring whether that store has a certain item in stock. The store employee suspects that a store in a neighboring town may have the item. The employee wishes to transfer the call to the other store, but there is no special private branch exchange (PBX) functionality among branch offices of the store.

In each of the above instances, one could hang up and redial/reconnect on the alternate communications device. That, however, interrupts the conversation that is in progress. Furthermore, redialing the connection is inconvenient, especially if it involves looking up a telephone number. Additionally, a party runs the risk of the person on the other end being diverted to another call or activity while that party redials the connection.

A "call forwarding" function is performed by current telecommunications networks to forward a call to another number. That function, however, is performed on a call before the call is completed; i.e., before the called party answers. The function is invoked by a party that expects incoming calls but does not expect to be able to answer the calls at a called station. The network automatically forwards the calls to a different station that has been specified before the call was initiated. The call forwarding function is not useful in transferring an in-progress call.

Some PBX's permit calls to be transferred from one communications device to another. Switching for that function is done within the PBX. That capability is therefore not available on cellular phones, public land-line phones, and computers, and is not available in the situations described above.

U.S. Pat. No. 6,070,054 to Foladare et al., assigned to the same assignee as the present application, addresses the problem of a mobile individual having multiple communications devices through which the individual may be reached. The individual is assigned a personal telephone number that is used to reach the individual regardless of his or her location. The individual uses a two-way pager to transmit call control parameters that are used by the telephone network to route calls directed to the personal telephone number. The two-way pager is also used to transmit subsequent routing parameters that are used by the network to reroute calls that have been previously routed.

There is therefore a need for a method and apparatus for transferring an in-progress communication from one communications device to another using the PSTN and/or the communications device itself, without disrupting the communication and without redialing and reestablishing the connection.

SUMMARY OF THE INVENTION

The present invention addresses those needs by providing a method and apparatus for forwarding an in-progress communication from one communicating device to another in response to a request from one of the communication devices.

In one embodiment of the present invention, a method is provided for use in a public switched communications network that provides communications services. The method includes the steps of establishing a connection between first and second communicating stations, and receiving a signal from one of the communicating stations requesting a transfer of the connection and identifying a third station to which the connection is to be transferred. A connection is then established between one of the first and second communicating stations and the third station, and the connection between the first and second communicating stations is dropped.

The step of receiving a signal may include receiving a code identifying the third station. In that case, the method further comprises the step of translating the code to a telephone number of the third station. The step of receiving a signal may include receiving a telephone number of the third station. The signal may be received as either an out-of-band signal or an in-band signal.

The method may further include the step of creating a billing record of establishing a connection between one of the first and second communicating stations and the third station. That billing record may be an AMA record.

Another embodiment of the invention is a method of transferring a connection between first and second communicating stations that are distributed over a telephone communications network. The method includes the steps of receiving from the first station a request to transfer the connection to a third communicating station, and also receiving from the first station a code indicative of an identity of the third communicating station. The code is translated to a telephone number of the third communicating station. A connection is then established between the second station and the third station, and the connection is dropped between the first and second communicating stations.

In that method, the step of translating the code to a telephone number may include looking up the code in a conversion table associated with a user of the first communicating station. The method may further include the step of receiving an authorization to access the conversion table. The request and the code may be received as either in-band signals or out-of-band signals.

The method may further include the step of creating a billing record of establishing a connection between the second communicating station and the third station. That billing record may be an AMA record.

Another embodiment of the invention comprises a communications handset for connecting to a public switched telecommunications network. The handset includes at least one user input for generating a request to transfer a connection through the telecommunications network from the handset to a transferee communications device connected to the telecommunications network, and for identifying to the network the transferee telecommunications device. The handset also includes a processor configured for receiving the request to transfer the connection, for receiving an identification of the transferee communications device, and for signaling the telecommunications network to transfer the call to the identified device.

The handset may also include a memory for storing a plurality of telephone numbers corresponding to other telecommunications devices. In that case, the processor looks up a telephone number in the memory based on the user input, and transmits the telephone number when signaling the telecommunications network to transfer the call.

The user input of the handset may include a plurality of buttons representing corresponding telecommunications devices, in which case the processor signals the telecommunications network to transfer the call to a telecommunications device corresponding to a depressed button.

The handset may also include a memory for storing a plurality of telephone numbers corresponding to other communications devices. In that case, the processor is further configured to look up a telephone number in the memory based on the button depressed by the user and to transmit that telephone number when signaling the communications network to transfer the call.

The processor may be configured to transmit a code identifying the transferee device when signaling the communications network to transfer the call.

The handset may include a numeric keypad, in which case the processor is further configured to accept an identification of the transferee device from the numeric keypad.

These and other advantages of the invention will be apparent to those of ordinary skill in the art by reference to the following detailed description and the accompanying drawings.

BRIEF DESCRIPTION OF THE DRAWINGS

FIG. 4 shows a data structure for an exemplary personal transfer list database in accordance with one embodiment of the present invention.

FIG. 5 sets forth a diagram of a call transfer method illustrating another embodiment of the present invention.

DETAILED DESCRIPTION

Figure 1:
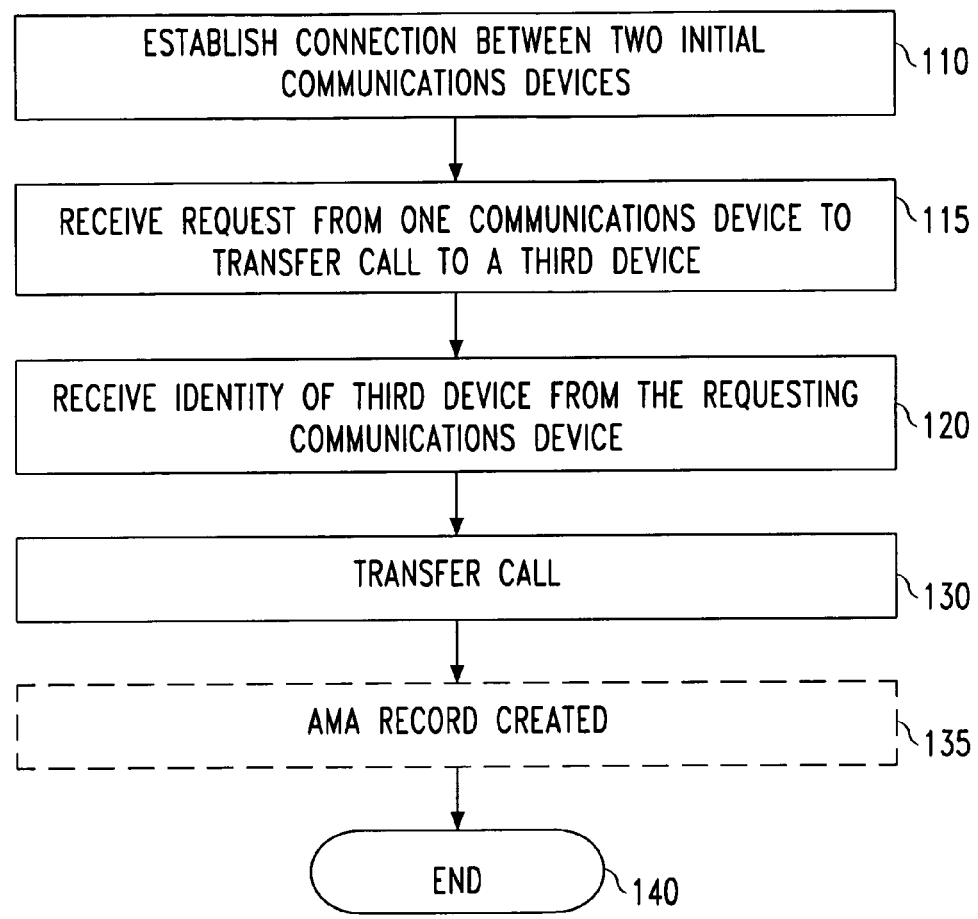
FIG. 1 sets forth a diagram of a call transfer method illustrating an embodiment of the present invention.

A method for transferring an in-progress communication from one communicating device to another in accordance with the present invention is shown in FIG. 1. A connection is first established (step 110) between two communications devices. That connection may be established by a network such as the PSTN or the Internet, and can therefore be a connection between remote devices. The communications devices need not be on the same local network or PBX. The term "connection" as used in this regard means an arrangement for transferring information between two points. The connection may, for example, be a circuit switched connection such as a traditional telephone network connection, or may be a virtual, packet switched connection as in the case of the Internet.

In a preferred embodiment of the invention, the connection is established as connections are normally established within the network; i.e. the network need not know ahead of time that the connection is to be transferred. For example, in a telephone network, the connection need not include an audio bridge or other special network equipment. In that way, subscribers need not make arrangements with the network beforehand in order to use the call transfer feature of the present invention.

The network receives a request (step 115) from one of the communications devices to transfer the connection to a third communications device, or transferee device. In a preferred embodiment, the communications device sending the request is the transferring device; i.e., the device from which the call is to be transferred. For example, a caller using a cellular phone in her car may arrive home and request that the network transfer the call from the cellular phone to a land-line-based phone in her house. Alternatively, a caller using a home phone may wish to leave the home but to continue a conversation on a cellular phone in the car. In each case, in accordance with the present invention, the caller requests the network to transfer the call to another communications device.

The request to transfer the call may be received from the requesting party as an in-band signal or as an out-of-band signal. An in-band signal, as used herein, means a signal transmitted using the same frequency range or other data transfer medium as that used to transfer the primary information exchanged over the connection. For example, a tone generated by a touch-tone phone may be transferred by the network as an audio tone included in an audio signal representing a conversation. In contrast, an out-of band signal, as used herein, is a signal transmitted through the network separately from the primary information. For example, an out-of-band signal may be created by a user pressing "*12" to invite a transfer service according to the invention. That signal is transmitted using the ITU Signaling System 7 (SS7), as described below.

The network also receives an identity of the third, or transferee, device (step 120) to which the call is to be transferred. The third device need not be on the same local network or PBX as the requesting device. It is instead sufficient that the third device be accessible from the network to which the requesting device is connected.

After the network has received the request to transfer and the identity of the transferee device, the network transfers the call (step 130) and, optionally, a call record such as an Automatic Message Account (AMA) message record is created (step 135). In one embodiment of the invention utilizing the PSTN, the call is transferred by sending a ring signal to the transferee device. When the transferee device answers, the transferring device is disconnected.

Figure 2:
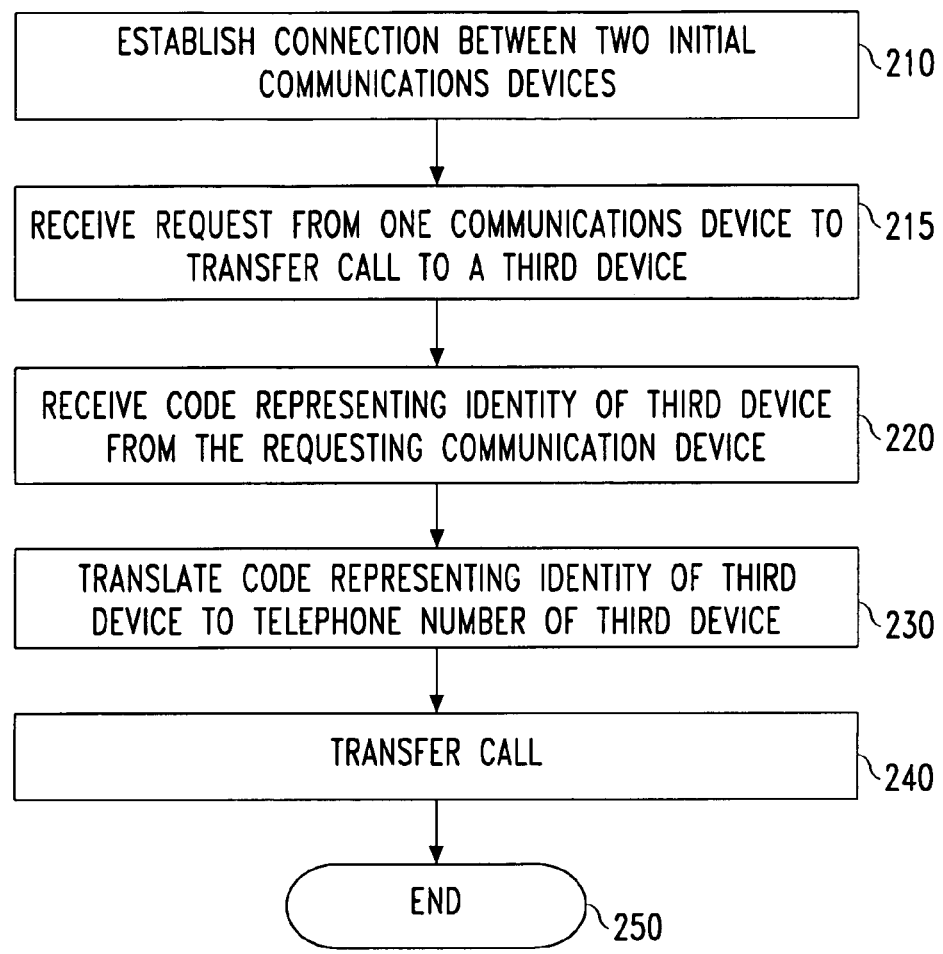
FIG. 2 sets forth a diagram of a call transfer method illustrating another embodiment of the present invention.

In a variation of the method of FIG. 1, the transfer is performed primarily by the network, as shown in the flow chart of FIG. 2. A connection is initially established (step 210) by a network between two communication devices. A request is received by the network (step 215) to transfer the call from one of the communication devices to a third device.

The network receives from the transferring device a code representing an identity of the transferee device (step 220). For example, a cellular telephone user may press "*12" to signal a request that the network transfer the call, followed by a "1" that is a code representing the identity of the user's home land-line-based station. Upon receiving the code, the network translates the code to a telephone number (step 230) based on a prearranged correlation of codes and telephone numbers established in the network by the user. The network then transfers the call from the transferring device to the transferee device (step 240) based on the identity of the transferee device.

Figure 3:
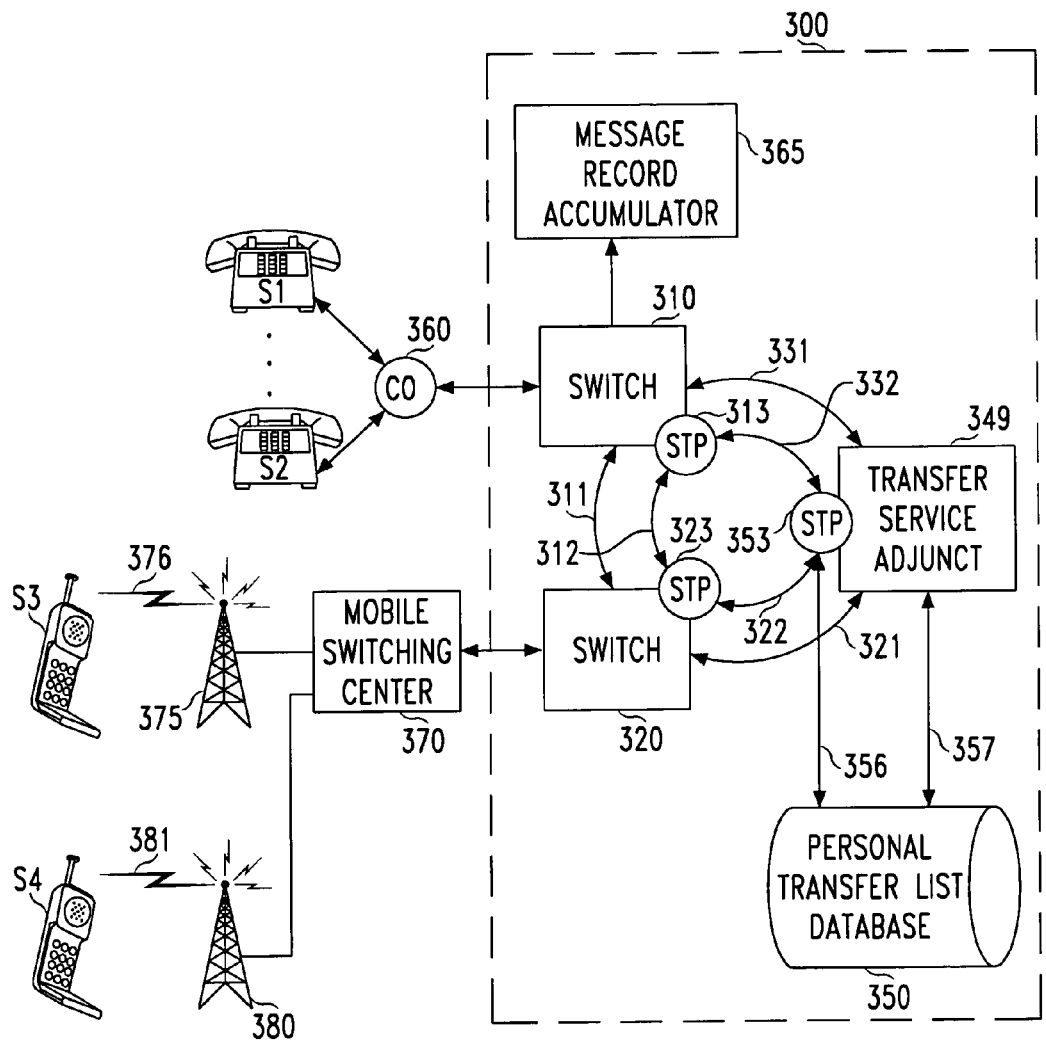
FIG. 3 shows an exemplary system architecture implementing one embodiment of the present invention.

An exemplary system for transferring a communication from one communications device to another in accordance with the present invention is shown in FIG. 3. That system utilizes a PSTN 300, such as the well-known AT&T long distance telephone network. The network provides long distance telephone services for its subscribers, including the subscribers associated with land line telephone stations S1 and S2, and wireless telephone stations S3 and S4. The communications network 300 includes network switches such as switches 310, 320. In the exemplary embodiment, the switches 310, 320 are switching offices interconnected to each other and to other switching offices via a so-called inter-toll network; e.g., 311, 321, 331.

Each switch in the exemplary network is also connected to a number of central offices such as central office 360, and/or mobile switching centers such as switching center 370. The operation of a central office and of a mobile switching center are well known and will not be discussed in detail herein. A central office is arranged to send to an associated switch of a network 300 a telephone call originated at a calling telephone station set (herein the calling party), e.g., S1, that has dialed a particular long distance telephone number. A mobile switching center 370 is arranged to connect through a base station 380 and wireless connection 381 to a called mobile station set (herein the called party), e.g., S4, a call that the mobile switching center receives from an associated switch.

The network 300 preferably includes an out-of-band signaling system for setting up calls and for providing transaction and other capabilities for subscribers. Out-of-band signaling systems typically provide signaling for such services as caller ID, call waiting and messaging services. The out-of-band signaling architecture includes signal transfer points (STP's) 313, 323, 353 that function as packet switches for routing signaling messages in the signaling system. The STP's are interconnected by a signaling system network 312, 322, 332. The out-of-band signaling system may also extend (not shown) to the central office 360 or mobile switching center 370 and subscriber station sets S1–S4. A preferred example of an out-of-band signaling system is the ITU Signaling System 7 (SS7), which has been generally accepted by the telecommunications industry. SS7 protocol uses destination routing, octet-oriented fields, variable-length messages and a maximum message length allowing for 256 bytes of data.

Transactional message records of the network 300 are stored by a message record accumulator 365, connected to one or more network switches such as switch 310. The message record accumulator 365 collects relevant data, such as billing data, for each call connected over the network 300. The relevant data collected by the message record accumulator 365 is preferably a standardized message record that may be used by other elements of the network.

In a typical data recording system utilizing a message record accumulator such as accumulator 365, relevant data such as billing data is recorded for each toll call, or connection, in a so-called automatic message account, or AMA, message record. Typical message record fields are the originating and terminating telephone numbers and elapsed time of call. The accumulator 365 of the present invention furthermore may have message record fields for recording use of the transfer service of the invention. For example, the message record may include fields for recording that the service was used, for recording call details of the transfer, etc. In a typical system, the message records, which are created for each call at a time substantially contemporaneous with the termination of the call, are transmitted from an originating switch to a message accumulation system such as accumulator 365. The latter distributes the accumulated messages to appropriate further processing systems that translate the AMA message records into the industry-standard "exchange message interface," or EMI, message record format. The EMI records are thereupon forwarded to a rating system that, among other things, computes the toll charges applicable to the calls and adds an indication of those charges to the EMI record. The records thus formed are forwarded to a billing system in which they reside until processed to generate, typically, "hard copy" bills that are mailed to subscribers.

A transfer service adjunct 349 is included in the communications network 300. The adjunct 349 operates, in accordance with the invention, to coordinate the transfer of calls to a third station set according to instructions received from a party to an ongoing communication. The transfer service adjunct 349 may send and receive voice-band signals via the inter-toll network 321, 331, and/or may send and receive signaling messages via the out-of-band network 322, 332 and signal transfer point 353.

A personal transfer list database 350 may be connected to the network either via the transfer service adjunct 349, as shown in FIG. 3, or via another switch such as switches 310, 320. The personal transfer list database 350 includes a record for each transfer service subscriber. Each record contains one or more transfer destinations such as telephone numbers. The transfer destinations correspond to station sets available for a subscriber to transfer calls.

An exemplary database structure 400 for the personal transfer list database 350 is shown in FIG. 4. The structure 400 includes records such as record 410 containing an identification of a transfer service subscriber. The identity, shown as a subscriber name in FIG. 4, is a unique identifier that may be used by the network to retrieve or record information associated with that subscriber.

The record 410 also contains a correlation table with codes such as indices 415, 425 and correlating transfer targets such as telephone number 420 and Internet instant messaging service address 430. In a network-based embodiment of the invention, the transfer service adjunct 349 (FIG. 3) receives from a requesting station a code representing a transferee station. Using that code, the adjunct looks up the telephone number or other address in the record 410 corresponding to that subscriber, and coordinates the transfer of the communication to the transferee station.

The record 410 for each subscriber is created in advance. For example, the subscriber may place in the record the subscriber's home telephone number, office number, cell phone number, an instant messaging address or any other destination to which the subscriber may wish to transfer a communication. Access to and use of the list may be limited to a given station set; in that case, access may be controlled using automatic number identification (ANI). Alternatively, the list may be available to any station set and may be accessible via a PIN or password. In another example, all or a subset of the station sets contained in the list may be authorized to transfer calls to other station sets on the list.

Returning to FIG. 3, in practice, two or more of the components including the transfer service adjunct 349, the personal transfer list database 350 and the message record accumulator 365 may be collocated at a common network node. It is furthermore likely that a plurality of each component would be deployed in a network.

Figure 6:
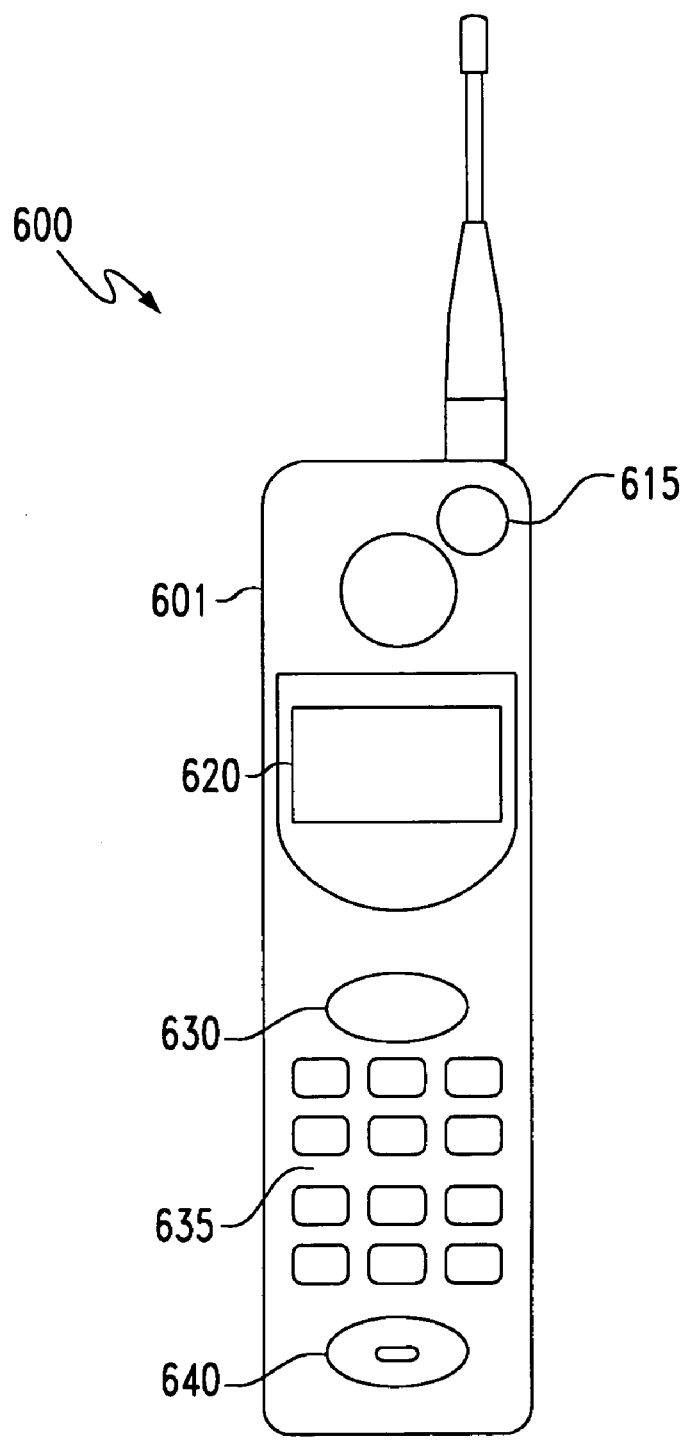
FIG. 6 shows a wireless telephone handset incorporating one embodiment of the invention.

A hybrid network-based and communications-device-based solution of the present invention is shown in FIGS. 5 and 6. As in previous embodiments, an initial connection is established (step 510) and a request is received by the network from one of the communication devices to transfer the communication to a third device (step 515).

The network furthermore receives from the requesting device the telephone number or other address of the third device (step 520). The subscriber may manually input that address at the time the request is made. For example, to transfer a call to a telephone having the telephone number 908-221-2000, a subscriber may input *129082212000. Alternatively, the transferring device may have an integral memory containing frequently used transferee numbers. That memory may be the same memory used by a "speed dial" feature of the station set, or may be a separate memory. In one embodiment, the stored telephone numbers in the speed dial memory are recalled in the same manner used to place an original call, but preceded with a code for transferring. For example, to transfer a call to the station set having a telephone number stored in the third memory register of a handset, one would dial *12[memory]3 where a the handset has a dedicated memory button.

A dedicated button or other user input may be incorporated into a handset to facilitate invoking the transfer function of the invention. For example, a cellular telephone handset 600, shown in FIG. 6, comprises a body 601 having a display 620, an on/off button 615 and a keypad area 635. The keypad area contains alphanumeric buttons conventionally used in touchtone keypads. In accordance with the present invention, the keypad area 635 also includes an additional button 640 that invokes the transfer function of the invention.

To use the dedicated button 640 in accordance with the invention, the button is pressed, followed by pressing a button in the numeric keypad corresponding to a transferee station set. In one embodiment of the invention, telephone numbers or other identifiers are stored in the handset memory, and the handset sends the telephone number of the intended transferee to the network together with a request to transfer the call, as described above. The memory may or may not be the same handset memory used for storing "speed dial" numbers. Alternatively, after pressing the dedicated button 640, the user may enter the telephone number directly using the keypad, or the network may perform a database lookup on a touchtone code transmitted by the handset.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on existing switched voice telephony network architecture. However, the principles of the present invention could be extended to other communications architecture, such as Internet telephony, facsimile, instant messaging or other data communications. Such an extension could be readily implemented by one of ordinary skill in the art given the above disclosure.

What is claimed is:

1. A method for use in a non-PBX public switched communications network that provides communications services, the method comprising the steps of:

at a transfer service adjunct comprised in a communications network:

establishing a connection between first and second communicating stations;

receiving a signal from one of said first and second communicating stations requesting a transfer of the connection and identifying a third station to which the connection is to be transferred, the signal manually entered by a user and comprising a code;

translating the code to an Internet instant messaging service address of the third station based on a prearranged correlation of codes and public switched communications network addresses established by the user and stored in a database connected to the public switched communications network;

establishing a connection between the other one of the first and second communicating stations and the third station; and dropping the connection between the first and second communicating stations.

2. The method as claimed in claim 1, wherein the step of receiving a signal includes receiving a telephone number of the third station.

3. The method as claimed in claim 1, wherein the step of receiving a signal includes receiving an out-of-band signal via an inter-toll network comprised in said communications network.

4. The method as claimed in claim 1, wherein the step of receiving a signal includes receiving an in-band signal via a signal transfer point comprised in said communications network.

5. The method as claimed in claim 1, further comprising the step of creating a billing record of establishing a connection between one of the first and second communicating stations and the third station.

6. The method as claimed in claim 5, wherein the billing record is an AMA record.

7. A method of transferring a connection between first and second communicating stations that are distributed over a non-PBX public switched communications network, the method comprising the steps of:
  at a transfer service adjunct comprised in a communications network:
    receiving from the first station a request to transfer the connection to a third communicating station;
    receiving from the first station a code indicative of an identity of the third communicating station, the code manually entered by a user;
    translating the code to an Internet instant messaging service address of the third communicating station based on a prearranged correlation of codes and public switched communications network addresses established by the user and stored in a database connected to the public switched communications network;
    establishing a connection between the second station and the third station; and
    dropping the connection between the first and second communicating stations.

8. The method as claimed in claim 7, wherein the step of translating the code to a telephone number includes looking up the code in a conversion table associated with a user of the first communicating station.

9. The method as claimed in claim 8, further comprising the step of receiving an authorization to access the conversion table.

10. The method as claimed in claim 7, wherein the steps of receiving the request and the code further comprise receiving out-of-band signals.

11. The method as claimed in claim 7, wherein the steps of receiving the request and the code further comprise receiving in-band signals.

12. The method as claimed in claim 7, further comprising the step of creating a billing record of establishing a connection between the second station and the third station.

13. The method as claimed in claim 12, wherein the billing record is an AMA record.

14. A communications handset for connecting to a non-PBX public switched telecommunications network, the handset comprising:
  at least one user input adapted to receive a request manually entered by a user of the handset, the request to transfer a connection through the telecommunications network from the handset to a transferee communications device connected to the telecommunications network, the request adapted to identify to the telecommunications network the transferee telecommunications device, the request comprising a code adapted to be translated to an Internet instant messaging service address of the transferee telecommunications device based on a prearranged correlation of codes and public switched communications network addresses established by the user and stored in a database connected to the public switched telecommunications network;
  a processor configured to receive the request to transfer the connection, receive an identification of the transferee communications device from a transfer service adjunct comprised in the telecommunications network, and signal the telecommunications network to transfer the connection to the transferee communications device.

15. The handset as claimed in claim 14, further comprising a memory for storing a plurality of telephone numbers corresponding to other telecommunications devices, and wherein the processor looks up a telephone number in the memory based on the request, and transmits the telephone number when signaling the telecommunications network to transfer the connection.

16. The handset as claimed in claim 14, wherein the user input comprises a plurality of buttons representing corresponding telecommunications devices, and the processor signals the telecommunications network to transfer the connection to a telecommunications device corresponding to a depressed button.

17. The handset as claimed in claim 16, further comprising a memory for storing a plurality of telephone numbers corresponding to other communications devices, and wherein the processor is further configured to look up a telephone number in the memory based on the depressed button and to transmit that telephone number when signaling the telecommunications network to transfer the connection.

18. The handset as claimed in claim 16, wherein the processor is further configured to transmit a code identifying the transferee communications device when signaling the communications network to transfer the connection.

19. The handset as claimed in claim 14, further comprising a numeric keypad, and wherein the processor is further configured to accept an identification of the transferee communications device from the numeric keypad.

20. The handset as claimed in claim 14, further adapted to transmit the request via an out of band signal.

* * * * *